US012673846B2

(12) United States Patent
Mikkonen et al.

(10) Patent No.: US 12,673,846 B2
(45) Date of Patent: Jul. 7, 2026

(54) ELEVATOR PARKING BRAKE, METHOD FOR OPERATING AN ELEVATOR PARKING BRAKE, AND CONTROL DEVICE FOR AN ELEVATOR PARKING BRAKE

(71) Applicant: KONE Corporation, Helsinki (FI)

(72) Inventors: Janne Mikkonen, Helsinki (FI); Markku Haapaniemi, Helsinki (FI); Matti Räsänen, Helsinki (FI); Juha Helenius, Helsinki (FI); Otto Lanz, Helsinki (FI)

(73) Assignee: KONE CORPORATION, Helsinki (FI)

(*) Notice: Subject to any disclaimer, the term of this patent is extended or adjusted under 35 U.S.C. 154(b) by 0 days.

(21) Appl. No.: 18/744,389

(22) Filed: Jun. 14, 2024

(65) Prior Publication Data

US 2024/0336455 A1 Oct. 10, 2024

Related U.S. Application Data

(63) Continuation of application No. PCT/EP2022/081741, filed on Nov. 14, 2022.

(30) Foreign Application Priority Data

Dec. 17, 2021 (EP) .................................... 21215400

(51) Int. Cl.
*B66B 5/18* (2006.01)
*B66B 5/20* (2006.01)
*B66B 7/04* (2006.01)

(52) U.S. Cl.
CPC ................. *B66B 5/18* (2013.01); *B66B 5/20* (2013.01); *B66B 7/04* (2013.01)

(58) Field of Classification Search
CPC ................ B66B 5/18; B66B 7/04; B66B 5/20
See application file for complete search history.

(56) References Cited

U.S. PATENT DOCUMENTS 6,176,350 B1 * 1/2001 Schlosser .................. B66B 5/20 188/41
8,186,483 B2 * 5/2012 Sirigu ....................... B66B 5/22 187/373

(Continued)

FOREIGN PATENT DOCUMENTS

CN 108698791 A * 10/2018 ............... B66B 5/20
DE 102013111385 A1 * 4/2015 ............... B66B 5/18

(Continued)

OTHER PUBLICATIONS

European Search Report issued in Application No. EP 21 21 5400 dated May 27, 2022.

(Continued)

*Primary Examiner* — Minh Truong
*Assistant Examiner* — Michelle M Mudwilder
(74) *Attorney, Agent, or Firm* — Birch, Stewart, Kolasch & Birch, LLP

(57) ABSTRACT

An elevator parking brake, a method for operating an elevator parking brake, and a control device for an elevator parking brake are provided. The elevator parking brake includes a parking brake frame attachable to an elevator car, a brake pad configured to be brought in contact with a guide rail guiding the elevator car along an elevator shaft, and an actuating mechanism mounted on the parking brake frame, for bringing the brake pad in contact with the guide rail and retracting the brake pad from the guide rail. The actuating mechanism includes a motor, an actuating member and a conversion mechanism configured to convert a rotational movement of the motor into a linear movement of the actuating member. The actuating member brings the brake (Continued)

pad in contact with the guide rail and retracts the brake pad from the guide rail. The conversion mechanism includes a cam mechanism having a cam member driven to rotate by the rotational movement of the motor, wherein a driving profile of the cam member is in contact with the actuating member. The driving profile is configured to convert the rotational movement of the cam member into the linear movement of the actuating member.

17 Claims, 8 Drawing Sheets

(56) References Cited

U.S. PATENT DOCUMENTS 9,663,326 B2 * 5/2017 Osmanbasic ............. B66B 5/18
11,447,365 B2 * 9/2022 Husmann ................ B66B 17/34
2012/0152663 A1 * 6/2012 Legeret ..................... B66B 5/04
187/404
2013/0081908 A1 * 4/2013 Meierhans ................ B66B 5/20
188/67
2013/0248298 A1 * 9/2013 Osmanbasic ............. B66B 5/20
187/359
2015/0144435 A1 5/2015 Etzweiler et al.
2020/0207575 A1 * 7/2020 Koskinen ............ F16D 65/0972
2020/0207582 A1 * 7/2020 Koskinen .................. B66B 5/18
2021/0139275 A1 5/2021 Koskinen et al.
2022/0363515 A1 11/2022 Bütler et al.

FOREIGN PATENT DOCUMENTS

WO WO 2014/124838 A1 8/2014
WO WO 2021/084012 A1 5/2021

OTHER PUBLICATIONS

International Search Report for PCT/EP2022/081741 (PCT/ISA/210) mailed on Jan. 19, 2023.
Written Opinion of the International Searching Authority for PCT/EP2022/081741 (PCT/ISA/237) mailed on Jan. 19, 2023.

* cited by examiner

ELEVATOR PARKING BRAKE, METHOD FOR OPERATING AN ELEVATOR PARKING BRAKE, AND CONTROL DEVICE FOR AN ELEVATOR PARKING BRAKE

CROSS-REFERENCE TO RELATED APPLICATIONS

This application is a Continuation of PCT International Application No. PCT/EP2022/081741, filed on Nov. 14, 2022, which claims priority under 35 U.S.C. 119 (a) to Patent Application No. 21215400.9, filed in Europe on Dec. 17, 2021, all of which are hereby expressly incorporated by reference into the present application.

BACKGROUND OF THE INVENTION

Field of the Invention

The present disclosure relates to an elevator parking brake, a method for operating an elevator parking brake, and a control device for an elevator parking brake.

Description of Related Art

When an elevator car arrives at a landing in an elevator shaft, the elevator car is brought in the door zone so that the elevator car door sill and the landing door sill are aligned, before permitting passengers to enter or exit the elevator car.

By passengers entering or exiting the elevator car, a load applied to the elevator car is changed, and suspension ropes suspending the elevator car are elastically deformed. This results in a tension change in the suspension ropes, which may move the elevator car upwards or downwards in the elevator shaft. Such an upward or downward movement leads to a misalignment of the elevator car door sill and the landing door sill. The misalignment creates a step between the elevator car and landing, thereby posing a tripping hazard and making safe boarding and exit of further passengers impossible.

Conventionally, the suspension ropes of an elevator are often over-dimensioned, i.e. the suspension ropes are designed much thicker than actually required with respect to the desired load bearing capacity. Thus, passenger comfort and parking precision are obtained, but also the weight of the suspension ropes increases significantly. Particularly in high-rise applications, e.g. in tall buildings, the advantage of over-dimensioning is thus limited by the maximum weight of the suspension ropes.

In order to prevent over-dimensioning of the suspension ropes and to enable proper alignment of the elevator car door sill and the landing door sill, elevator parking brakes are used. The parking brake holds the elevator car in its place during loading and unloading and releases its grip after the load has been transferred to the suspension ropes and the car and landing doors have been closed, before the elevator starts to run again.

An object of the present disclosure is to provide an elevator parking brake with a simple configuration that increases passenger safety and comfort, a method for operating an elevator parking brake that increases passenger safety and comfort, and a control device for an elevator parking brake that increases passenger safety and comfort.

SUMMARY OF THE INVENTION

According to an aspect of the invention, a method for operating an elevator parking brake for braking an elevator car guided along an elevator shaft by a guide rail and suspended by a suspension rope which is hoisted by a traction sheave comprises the following method steps: activating the elevator parking brake so as to bring a brake pad of the elevator car in contact with the guide rail; acquiring a first suspension rope force in the suspension rope, which is detected by a load cell at an upper suspension rope suspending point, a load cell located between the traction sheave and a traction sheave mounting point of the elevator shaft, or a first traction sheave torque applied to the traction sheave, which is detected by a traction sheave torque acquiring means before permitting a loading and/or unloading situation of the elevator car; while the elevator parking brake is maintained in an activated state, permitting the loading and/or unloading situation of the elevator car so as to allow applying a differential load to the elevator car, the elevator parking brake at least partially bearing the differential load; acquiring a second suspension rope force in the suspension rope or a second traction sheave torque applied to the traction sheave, while the elevator parking brake is maintained in the activated state and after permitting the loading and/or unloading situation of the elevator car; tightening or loosening the suspension rope so as to at least partially transfer the differential load borne by the elevator parking brake to the suspension rope, while the elevator parking is maintained in the activated state; and deactivating the elevator parking brake by retracting the brake pad from the guide rail, after tightening or loosening of the suspension rope.

According to the above-described method for operating an elevator parking brake, suspension rope tension can be suitably adjusted before the elevator parking brake is opened. The rope tension is adjusted depending on the load change of the elevator car during loading and/or unloading. Thus, the elevator car door sill and the landing sill are aligned in the loading and/or unloading situation. Therefore, a tripping hazard is effectively prevented. Further, a drop or a jump of the elevator car after the loading and/or unloading of the car can be prevented, since the suspension ropes are suitably loosened or tightened, depending on the change of the weight of the elevator car. Therefore, passenger safety and comfort can be improved.

The method for operating an elevator parking brake may further comprise a step of comparing the first suspension rope force with the second suspension rope force or comparing the first traction sheave torque with the second traction sheave torque and determining that the suspension rope is to be tightened if the second suspension rope force is higher than the first suspension rope force or the second traction sheave torque is higher than the first traction sheave torque, and determining that the suspension rope is to be loosened if the second suspension rope force is lower than the first suspension rope force or the second traction sheave torque is lower than the first traction sheave torque.

Accordingly, it can be determined whether the suspension rope is to be loosened or tightened, depending on the change of the weight of the elevator car in a fast and reliable manner such to as further improve passenger comfort and safety as well as door-to-door time.

The method for operating an elevator parking brake may further comprise a step of stopping the tightening or loosening of the suspension rope when a slope of the second suspension rope force or a slope of the second traction sheave torque with respect to a rotation angle of the traction sheave, by which the suspension rope is tightened and loosened, becomes lower than a threshold value.

Accordingly, it can be reliably detected that the load of the elevator car is substantially carried by the suspension rope, since the rope tension in the suspension rope does not or only insignificantly change when further loosening or tightening the suspension rope. Consequently, it can be reliably detected that the rope tension is correct for opening the brake. Therefore, passenger safety and comfort can be further improved.

In the method for operating an elevator parking brake the second suspension rope force or the second traction sheave torque may be acquired after stopping the loading and/or unloading situation of the elevator car.

Accordingly, the adjustment of the suspension rope tension is performed only once when the loading or unloading of the elevator car is finished. Therefore, the suspension rope tension is not constantly adjusted during loading and unloading. Therefore, the method for operating an elevator parking brake can be simplified and unnecessary adjustment of the suspension rope tension at a time when the load of the elevator car still changes can be avoided.

According to another aspect of the invention, a method for operating an elevator parking brake comprises a step of determining whether an elevator car in an elevator shaft is located in a predetermined limit floor or below, a step of activating an elevator parking brake before permitting a loading and/or unloading situation of the elevator car, when the elevator car in the elevator shaft is located in the predetermined limit floor or below the predetermined limit floor, and a step of prohibiting activating the elevator parking brake before permitting a loading and/or unloading situation of the elevator car, when the elevator car in the elevator shaft is located in a floor above the predetermined limit floor.

In lower floors, suspension ropes are longest and their elongation is largest. Accordingly, the elevator parking brake is used only in the lower floors but not in upper floors, where usage of the elevator parking brake is unnecessary. This enables a fast and simple start in upper floors by decreasing door-to-door time and simplifying elevator control in the upper floors. Further, by such method, the lifetime of the elevator parking brake can be increased.

In the method for operating an elevator parking brake the predetermined limit floor may be determined on the basis of a mass of the elevator car and predetermined limit values for a maximum tolerated sag and bounce of the elevator car.

Accordingly, determination of the limit floor is suitably made based on parameters influencing sag and bounce characteristics and the limits for tolerated sag and bounce characteristics, which are set in accordance with passenger safety and comfort.

The above methods for operating an elevator car may be combined such that when the elevator car in the elevator shaft is located in the predetermined limit floor or below, the elevator parking brake is controlled such that suspension rope tension can be suitably adjusted before the elevator parking brake is opened and in the floors above the predetermined limit floor, the elevator parking brake is not used. According to such combined method for operating an elevator parking brake, both passenger comfort and safety and fast and simple start of the elevator car in the upper floors can be obtained in an outstanding manner.

According to another aspect of the invention, a control device for an elevator parking brake is configured to perform the above methods for operating an elevator parking brake.

According to another aspect of the invention, an elevator parking brake comprises a parking brake frame attachable to an elevator car, a brake pad configured to be brought in contact with a guide rail guiding the elevator car along an elevator shaft, and an actuating mechanism mounted on the parking brake frame, for bringing the brake pad in contact with the guide rail. The actuating mechanism comprises a motor, an actuating member and a conversion mechanism configured to convert movement of the motor into linear movement of the actuating member, the actuating member thereby bringing the brake pad in contact with the guide rail.

Due to the above structure of the elevator parking brake having the conversion mechanism, a movement of a motor can be suitably converted into movement of the brake pad of the elevator parking brake. Accordingly, even if a standard motor is used, a suitable speed profile can be obtained for the brake pad and sufficient force can be exerted by the motor such as to reliably brake the elevator car by suitably selecting a conversion ratio between the movement of the motor and the movement of the brake pad. Due to the above structure of the elevator parking brake it is further possible to employ either a rotary drive or a linear drive as the motor.

In the elevator parking brake, the parking brake frame may be attachable to an elevator car in a movable manner so as to allow a predetermined amount of movement between the parking brake frame and the elevator car in a gravity direction.

Accordingly, the elevator parking brake allows a movement between the parking brake frame and the elevator car such that the suspension ropes can be loosened or tightened in order to support the changed load of the elevator car. Therefore, the elevator parking brake supports the method for operating the elevator parking brake in which suspension rope tension can be suitably adjusted before the elevator parking brake is opened.

In the elevator parking brake, the conversion mechanism may comprise a planetary roller screw.

In the elevator parking brake, the motor may be an electric radial flux motor.

Accordingly, the drive mechanism of the elevator parking brake is configured by industrial components that are available in various dimensions. Thus, the parking brake is scalable for different applications (e.g. various elevator car capacities). Additionally, the elevator parking brake can be made compact in size.

In the elevator parking brake, the conversion mechanism may further comprise a reduction gear for gearing down a speed of the motor.

Accordingly, a large force can be exerted by the brake pad of the elevator parking brake even if a small motor is used as the drive for the brake pad. Thus, the elevator parking brake can be made cheaper and more compact in size.

In the elevator parking brake, the conversion mechanism may further comprise a cam mechanism having a driving profile, wherein the driving profile is at least partially configured to convert movement of the motor into linear movement of the actuating member.

Accordingly, an individual speed profile of the movement of the brake pad of the elevator parking brake can be obtained by a mechanic transmission of the uniform movement of the motor to the actuating member. Further, due to the above structure of the elevator parking brake having the cam mechanism, large conversion ratios can be achieved using little installation space.

In the elevator parking brake, the driving profile may at least partially be configured to set a variable conversion ratio between movement of the motor and linear movement of the actuating member.

In the elevator parking brake, the driving profile may comprise a closing profile configured to position the actuating member before the brake pad comes in contact with the guide rail, and a tightening profile continuous with the closing profile and configured to position the actuating member when the brake pad is in contact with the guide rail. Further, in the elevator parking brake, a tightening profile slope defined as a linear position variation of the actuating member divided by a rotation angle variation of the driving profile, when the actuating member is positioned by the tightening profile, may be smaller than a closing profile slope defined as a linear position variation of the actuating member divided by a rotation angle variation of the driving profile, when the actuating member is positioned by the closing profile.

According to the above structure of the elevator parking brake, an individual speed profile of the movement of the brake pad of the elevator parking brake can be obtained by a mechanic transmission of the uniform movement of the motor to the actuating member. Further, such individual speed profile of the brake pad shows a characteristic that initially, the brake pad moves with a high speed towards the guide rail such as to quickly close the gap between the brake pad and the guide rail and subsequently, upon contact with the guide rail, the moving speed of the brake pad is reduced such that high forces can be exerted by the brake pad. By such configuration of the elevator parking brake, it is possible to achieve both a fast reaction time of the elevator parking brake and high braking forces using a uniform movement of the drive. Therefore, door-to-door time of the elevator can be reduced and a small cheap motor can be employed as the drive of the elevator parking brake.

In the elevator parking brake, the closing profile may provide an increasing conversion ratio across the closing profile when rotating the driving profile in one direction, and the tightening profile may provide an increasing conversion ratio across the tightening profile when rotating the driving profile in the one direction.

Accordingly, the speed of the brake pad continuously decreases as the brake pad travels towards the guide rail. Further, the braking force continuously increases after contact has been established between the brake pad and the guide rail. Accordingly, the brake pad performs a smooth movement without abrupt changes in movement speed.

In the elevator parking brake, the cam mechanism may have a cam member driven to rotate by the movement of the motor, the driving profile may be formed on the cam member, the driving profile may be in contact with the actuating member, the driving profile may be configured to convert the rotational movement of the cam member into the linear movement of the actuating member, and a linear movement direction of the actuating member may be perpendicular to a rotation axis of the cam member and the driving profile.

Alternatively, in the elevator parking brake, the driving profile may be formed on the actuating member, and a linear movement direction of the actuating member may be parallel to a rotation axis of the driving profile.

By the above configurations of the elevator parking brake, the variable conversion ratio between the movement of the motor and the movement of the brake pad can be realized using compact and reliable mechanic transmissions.

The elevator parking brake may further comprise an auxiliary brake pad, the auxiliary brake pad and the brake pad being arranged at a predetermined distance from each other such that the guide rail is insertable therebetween. Further, the actuating mechanism may further comprise an auxiliary actuating member configured to bring the auxiliary brake pad in contact with the guide rail, a linear movement of the auxiliary actuating member being synchronized with and opposed to the linear movement of the actuating member.

Alternatively, the elevator parking brake may further comprise an auxiliary brake pad and a retaining spring elastically connecting the auxiliary brake pad to the parking brake frame. Further, the auxiliary brake pad and the brake pad may be are arranged at a predetermined distance from each other such that the guide rail is insertable therebetween.

Accordingly, a uniform braking force can be applied from both opposite sides of the guide rail by the brake pad and the auxiliary brake pad of the elevator parking brake. Such configuration increases reliability and lifetime of the braking mechanism by avoiding asymmetric loads being applied to the guide rail and the elevator parking brake.

BRIEF DESCRIPTION OF THE DRAWINGS

The aspects of the disclosure may be best understood from the following detailed description taken in conjunction with the accompanying figures. The figures are schematic and simplified for clarity, and they just show details to improve the understanding of the claims, while other details are left out. The individual features of each aspect may each be combined with any or all features of the other aspects. These and other aspects, features and/or technical effect will be apparent from and elucidated with reference to the illustrations described hereinafter, in which:

DETAILED DESCRIPTION OF THE PREFERRED EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practised without these specific details.

First Embodiment

Figure 1:
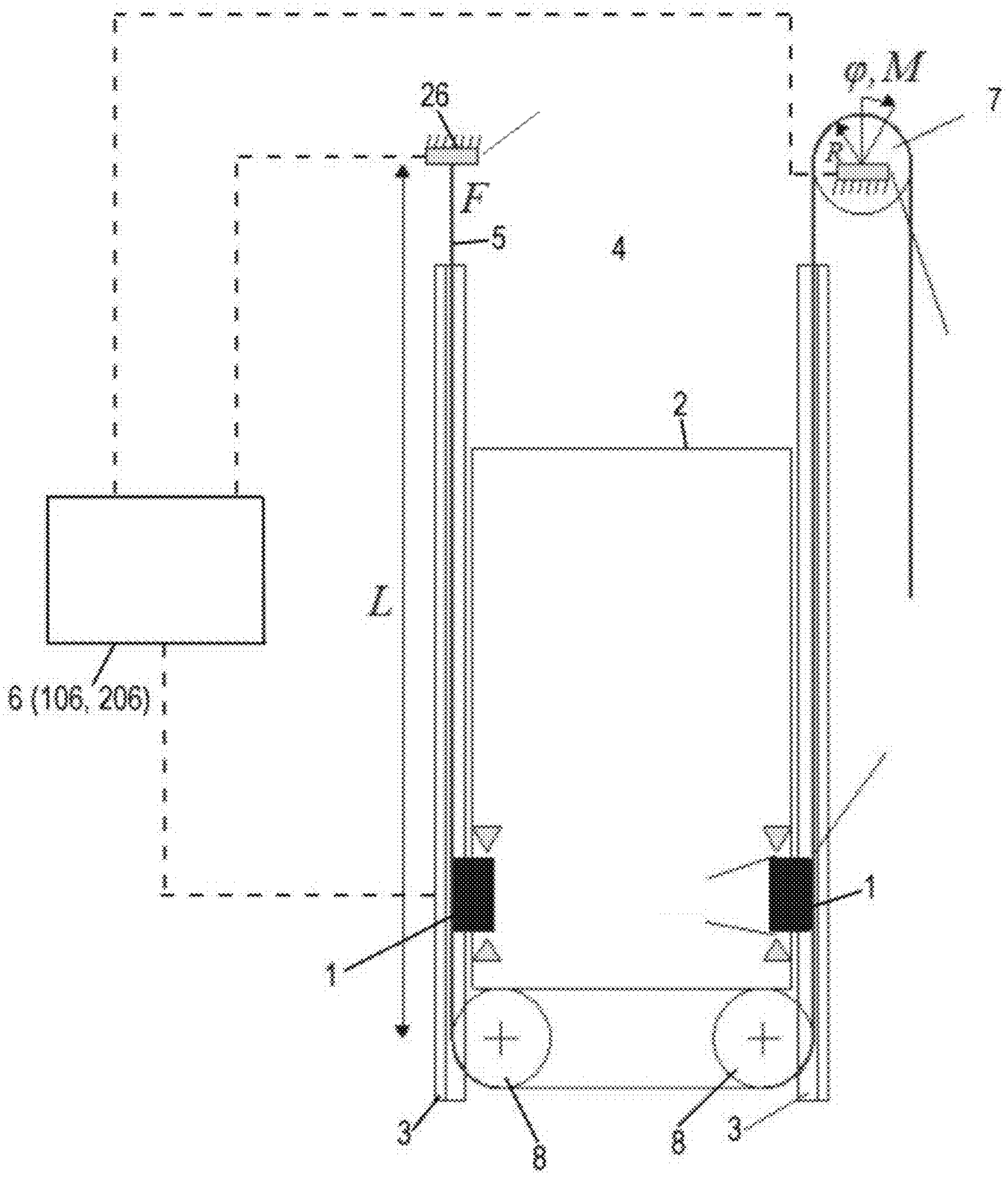
FIG. 1 illustrates an elevator system comprising an elevator parking brake according to a first embodiment of the present disclosure.
Figure 3A:
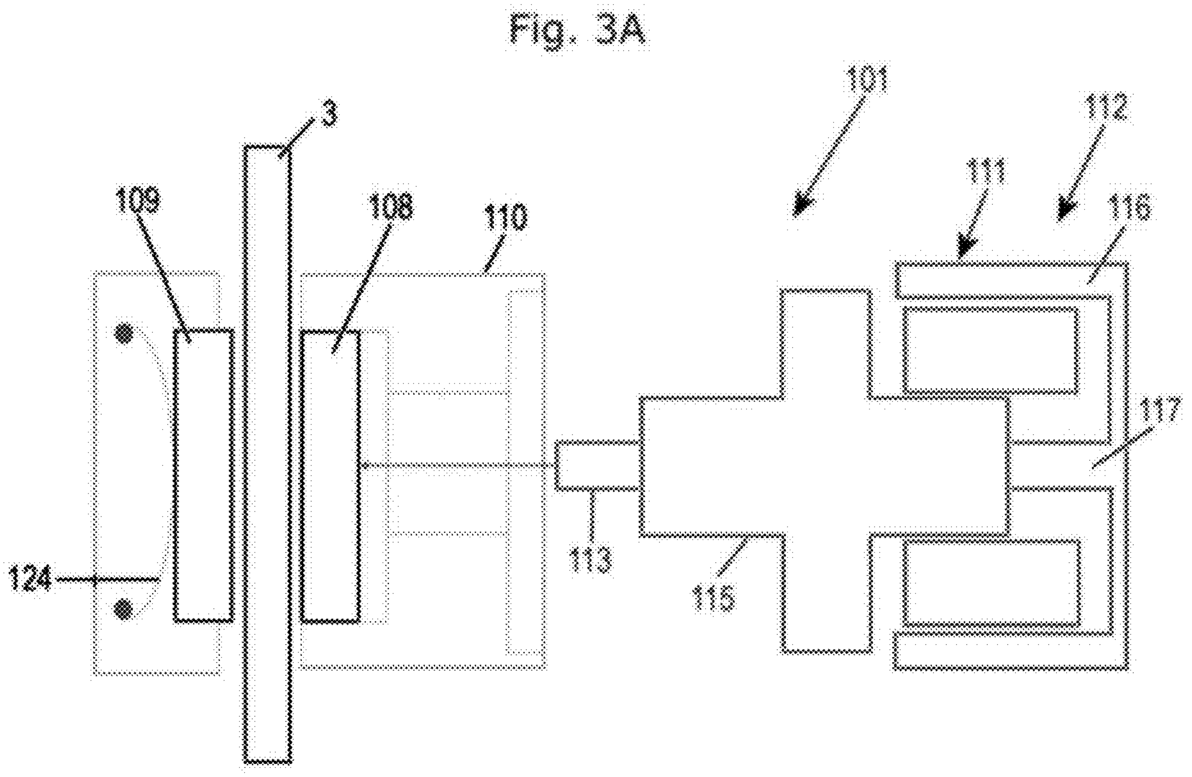
FIG. 3A schematically illustrates an elevator parking brake according to a third embodiment of the present disclosure.

FIG. 1 illustrates an elevator system comprising an elevator parking brake 1 of the present disclosure. FIG. 3A shows an example of an elevator parking brake 101 which can be used as the elevator parking brake 1 in the elevator system shown in FIG. 1.

The elevator system further comprises an elevator car 2 arranged in an elevator shaft 4 so as to be movable in an upward/downward direction. A movement of the elevator car 2 is guided by guide rails 3 fixed to and extending along opposite sides of the elevator shaft 4 in the upward/downward direction. In the present embodiment, two guide rails 3 are used. It is also possible, to provide only one guide rail 3 or three or more guide rails 3 for guiding the elevator car 2.

The elevator system further comprises a suspension rope 5 suspending the elevator car 2. That is, when the elevator parking brake 1 is deactivated, a load of the elevator car 2 is carried by the suspension rope 5. A suspension rope force is referred to as a tension in the longitudinal direction of the suspension rope 5. One end of the suspension rope 5 is fixed to an upper suspension rope suspending point 26 located at a top of the elevator shaft 4. From the upper suspension rope suspending point 26, the suspension rope 5 extends downwards to the elevator car 2, wraps around a pair of pulleys 8 fixed to the elevator car 2, extends upwards towards the top of the elevator shaft 4, and wraps around a traction sheave 7. In the present embodiment, one suspension rope 5 is used. It is also possible, to provide more than one suspension rope 5 for suspending the elevator car 2 in the elevator shaft 4. Not illustrated in FIG. 1 are a counterweight carried by the suspension rope 5 to balance the weight of the car 2 on the opposite side of the traction sheave 7 and a suspending point of the remaining end of the suspension rope 5 at the top of elevator shaft 4.

The roping ratio in the elevator system illustrated in FIG. 1 is 2:1. The use of an elevator parking brake according to the present invention is not limited to or prevented by any roping ratio of an elevator system.

The traction sheave 7 is driven by a drive motor (not shown) and is configured to lengthen and shorten a length of the suspension rope 5 between the upper suspension rope suspending point 26 and the traction sheave 7 by rotating in a counterclockwise direction and a clockwise direction, respectively. Thereby, the elevator car 2 is moved downward and upward in the elevator shaft 4, respectively, when the elevator parking brake 1 is deactivated. A torque applied to a rotation axis of the traction sheave 7 is referred to as a traction sheave torque.

The elevator parking brake 1 is configured to substantially hold the elevator car 2 in its place with respect to the guide rails 3 by bringing a brake pad 108 (see FIG. 3A, for example) of the elevator parking brake 1 in contact with the guide rail 3. Thereby, a movement of the elevator car 2 along the elevator shaft 4 is substantially prevented. When the elevator parking brake 1 is activated, a rotation of the traction sheave 7 in a counterclockwise direction and a clockwise direction causes a loosening and tightening of the suspension rope 5 between the upper suspension rope suspending point 26 and the traction sheave 7, respectively.

As shown in FIG. 1, the elevator system further comprises a control device 6. The control device 6 is connected to the elevator parking brake 1 and configured to control (operate) the elevator parking brake 1 (e.g. to activate and deactivate the elevator parking brake 1). Further, the control device 6 is connected to the drive motor of the traction sheave 7 and configured to control (operate) the drive motor (e.g. to cause a rotation of the traction sheave 7 in a counterclockwise and a clockwise direction).

Further, the control device 6 is configured to acquire the traction sheave torque detected by a traction sheave torque acquiring means. In the present embodiment, the traction sheave torque acquiring means is a controller of the drive motor of the traction sheave 7, which is capable of detecting an operating condition of the drive motor (e.g. power, rotation speed, electric voltage and current). The traction sheave torque is determined from the operating condition of the drive motor.

Alternatively, the traction sheave torque acquiring means may be a torque measurement device configured to measure the traction sheave torque. In this case, the control device 6 is configured to acquire the traction sheave torque measured by the torque measurement device.

Further, as shown in FIG. 1, the control device 6 is connected to a load cell located at the upper suspension rope suspending point 26. The load cell is conventionally known technology and is configured to measure the suspension rope force at the upper suspension rope suspending point 26. The control device 6 is configured to acquire the suspension rope force measured by the load cell. Alternatively, the load cell may also be located between the traction sheave 7 and a traction sheave mounting point of the elevator shaft 4.

Preferably, only one of the load cell, either located at the upper suspension rope suspending point 26 or between the traction sheave 7 and the traction sheave mounting point of the elevator shaft 4, and the traction sheave torque acquiring means is provided. Alternatively, it is possible to provide any of the load cell located at the upper suspension rope suspending point 26, the load cell located between the traction sheave 7 and the traction sheave mounting point of the elevator shaft 4, and the traction sheave torque acquiring means together, in order to increase a precision of the elevator parking brake, for example.

Figure 2A:
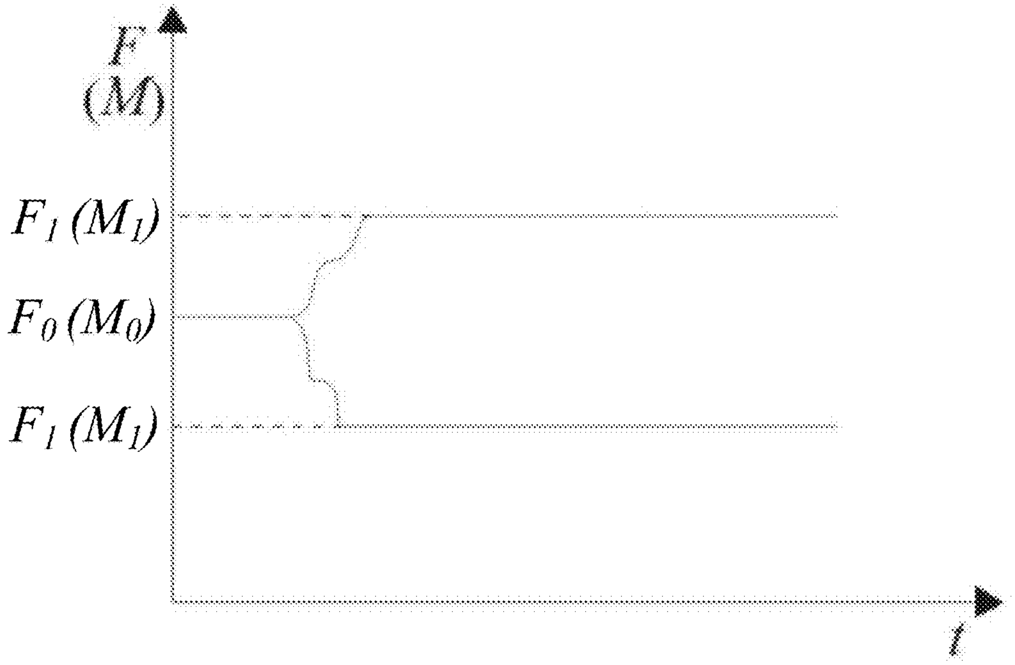
FIG. 2A schematically shows a suspension rope force and a traction sheave torque during a loading and/or unloading situation of an elevator car.

A method for operating an elevator parking brake according to the first embodiment is described below with reference to FIGS. 1, 2A and 2B.

The method for operating an elevator parking brake according to the first embodiment may be carried out with any elevator parking brake suitable for braking an elevator car 2, which is guided along an elevator shaft by a guide rail 3 and suspended by a suspension rope 5 which is hoisted by a traction sheave 7.

In a first step, the elevator parking brake 1 is activated by bringing a brake pad 108, 208, 308, 408, 508 of the elevator parking brake 1 in contact with the guide rail 3. In the present embodiment, the elevator parking brake 1 is activated when the elevator car 2 has arrived at the landing at a desired level along the elevator shaft.

The elevator parking brake 1 may also be activated before the elevator car 2 arrives at the landing (i.e. while the elevator car 2 is still moving along the elevator shaft). Thereby, rope stretch during deceleration of a descending elevator car 2 is reduced, and dynamic fluctuations in the suspension rope force (so-called bouncing) can be mitigated.

In a second step, a first suspension rope force $F_0$ in the suspension rope 5 is acquired by means of detection by the load cell at an upper suspension rope suspending point 26, the load cell located between the traction sheave 7 and the traction sheave mounting point of the elevator shaft 4, or a first traction sheave torque $M_0$ applied to the traction sheave 7 is acquired by means of detection by a traction sheave torque acquiring means, while the elevator parking brake 1 is maintained in an activated state and before permitting a loading and/or unloading situation of the elevator car 2.

In a third step, the loading and/or unloading situation is permitted. The loading and/or unloading situation refers to a state, in which the elevator car 2 is located at a landing at a desired level along the elevator shaft 4, and when increasing and/or decreasing the load of the elevator car 2 is permitted (e.g. when an elevator car door and a landing door are opened such that passengers can board and/or exit the elevator car 2). Particularly, the state of permitting the loading and/or unloading situation of the elevator car 2 refers to a predetermined opening degree of the elevator car door and the landing door. Specifically, the predetermined opening degree refers to a half-open state, when passengers can already board and/or exit the elevator car 2. Accordingly, during the loading and/or unloading situation, applying a differential load to the elevator car 2 is allowed. For example, when passengers board the elevator car 2, the total load of the elevator car 2 is increased, that is, the differential load becomes greater than zero. On the other hand, when passengers exit the elevator car 2, the total load of the elevator car 2 is decreased, that is, the differential load becomes smaller than zero.

The elevator parking brake 1 allows a predetermined amount of movement between the elevator car 2 and the guide rail 3 in a gravity direction by being attached to the elevator car 2 in a movable manner. Therefore, when applying the differential load to the elevator car 2, at least a part of the differential load is borne by the elevator parking brake 1, and another part of the differential load is borne by the suspension rope. Such a change of the suspension rope force F as function of time detected by the load cell at the suspension rope suspending point 26, the load cell located between the traction sheave 7 and the traction sheave mounting point of the elevator shaft 4, or the traction sheave torque detected by a traction sheave torque acquiring means is shown in FIG. 2A. Before the load change, the parking brake is centered, e.g. by centering springs, in its attachment allowing a predetermined amount of movement in the vertical direction. As the load in the car changes over time, the parking brake 1 reaches the limit of its allowed movement. Any further increase or decrease of the differential load is supported by the parking brake 1 and, thus, does not show as increase or decrease of the suspension rope force F or the traction sheave torque M.

In a fourth step, a second suspension rope force $F_1$ in the suspension rope 5 is acquired or a second traction sheave torque $M_1$ applied to the traction sheave 7 is acquired, while the elevator parking brake 1 is maintained in the activated state and after permitting the loading and/or unloading situation of the elevator car 2.

Preferably, the second suspension rope force $F_1$ or the second traction sheave torque $M_1$ is acquired after stopping the loading and/or unloading situation of the elevator car 2, e.g. after the doors are closed and the load of the elevator car 2 is not changed anymore. Alternatively, the fourth step can be performed multiple times in-between, i.e. while the load of the elevator car 2 is still changed.

By comparing the first suspension rope force $F_0$ with the second suspension rope force $F_1$, it is determined that, in order to essentially support the elevator car 2 with the new load by the suspension rope tension, the suspension rope 5 is to be tightened if the second suspension rope force $F_1$ is higher than the first suspension rope force $F_0$ or the second traction sheave torque $M_1$ is higher than the first traction sheave torque $M_0$, and determined that the suspension rope 5 is to be loosened if the second suspension rope force $F_1$ is lower than the first suspension rope force $F_0$ or the second traction sheave torque $M_1$ is lower than the first traction sheave torque $M_0$.

In a fifth step, the suspension rope 5 is tightened or loosened so as to at least partially transfer the part of the differential load borne by the elevator parking brake 1 to the suspension rope 5, while the elevator parking brake 1 is maintained in the activated state. Such an increase and decrease in the suspension rope force and the traction sheave torque is shown in FIG. 2B. Thereby, the part of the differential load borne by the elevator parking brake 1 is at least partially released from the elevator parking brake 1. Preferably, the whole part of the differential load borne by the elevator parking brake 1 is transferred to the suspension rope 5 such that the elevator parking brake 1 does not bear any force between the elevator car 2 and the guide rail 3 in the gravity direction (upward/downward direction).

While the suspension rope 5 is tightened (by increasing rotation angle $\phi$ of the traction sheave 7) or loosened (by decreasing rotation angle $\phi$ of the traction sheave 7) in the fifth step, a slope representing a change of the second suspension rope force or a slope representing a change of the second traction sheave torque is acquired and monitored by the control device 6. The tightening or loosening of the suspension rope 5 is stopped when the slope of the second suspension rope force or the slope of the second traction sheave torque with respect to a rotation angle of the traction sheave 7, by which the suspension rope 5 is tightened and loosened, is at or below a predetermined threshold value.

In the present embodiment, the threshold value is zero. Alternatively, other threshold values are conceivable.

Figure 2B:
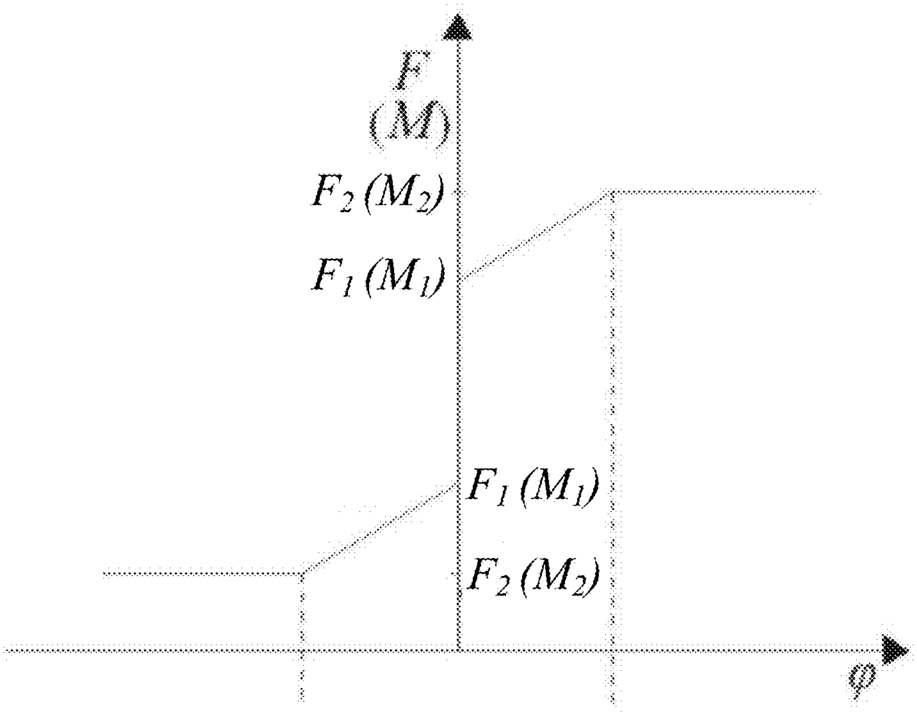
FIG. 2B schematically shows a suspension rope force and a traction sheave torque during tightening and loosening of a suspension rope suspending the elevator car.

As shown in FIG. 2B, a slope of the suspension rope force and the traction sheave torque change to a horizontal line (corresponding to no change of the suspension rope force or the traction sheave torque), when the rotation angle of the traction sheave 7 is further increased or decreased, respectively. When such a change of the slope of the suspension rope force or the traction sheave torque is detected, it is determined to stop the tightening or loosening of the suspension rope 5.

In a sixth step, the elevator parking brake 1 is deactivated by retracting the brake pad 108, 208, 308, 408, 508 from the guide rail 3, after having tightened or loosened the suspension rope 5 in the fifth step. Thereby, the elevator car 2 is permitted to start moving again along the elevator shaft.

According to the above-mentioned method for operating an elevator parking brake according to the first embodiment, the elevator car door sill and the landing sill are aligned in the loading and/or unloading situation. Thus, a tripping hazard is effectively prevented.

Further, according to the above-mentioned method for operating an elevator parking brake according to the first embodiment a drop or a jump of the elevator car upon releasing the parking brake after the loading and/or unloading of the car can be prevented, since the suspension ropes are suitably loosened or tightened, depending on the change of the weight of the elevator car.

Further, a control device 106 for an elevator parking brake 1 is provided. The control device 106 for an elevator parking brake 1 is configured to execute the method for operating an elevator parking brake described above.

The control device 106 can be used as the control device 6.

Second Embodiment

A method for operating an elevator parking brake according to a second embodiment is described below.

The method for operating an elevator parking brake according to the second embodiment may be carried out with any elevator parking brake suitable for braking an elevator car 2, which is guided along an elevator shaft by a guide rail 3 and suspended by a suspension rope 5, which is hoisted by a traction sheave 7.

In a first step of the method for operating an elevator parking brake according to the second embodiment, it is determined whether the elevator car 2 in the elevator shaft is located in the predetermined limit floor or below.

The limit floor is determined on the basis of a total suspension stiffness (type and number of suspension ropes, reeving ratio, suspension rope length between elevator car and traction sheave, elevator car isolation stiffness, suspension rope fixing spring stiffness), a mass of the elevator car (this affects e.g. bouncing frequency and conventional steel suspension rope stiffness due to their non-linear force-strain relationship), and limit values for elevator car sag and bounce.

As an example, the limit floor can be determined from a limit suspension rope length L determined by the following example calculation:

$$L = \frac{EAn_{sr}r\left(\Delta x - \frac{m_p g}{k_{pl}}\right)}{m_p g} = \frac{2000\ \text{kN} \times 4 \times 2 \times \left(4\ \text{mm} - \frac{75\ \text{kg} \times 9.81\ \text{m/s}^2}{800\ \text{N/mm}}\right)}{75\ \text{kg} \times 9.81\ \text{m/s}^2} \approx 67\ \text{m}$$

In the above example calculation, EA is an axial stiffness of the hoisting rope, $n_{sr}$ is the number of suspension ropes, r is a reeving ratio of the elevator, $\Delta x$ is the limit value for elevator car sag with one passenger, $m_p$ is the mass of one passenger, g is the gravitational acceleration near Earth's surface, and $k_{pl}$ is a stiffness of the car isolation layer, e.g. an isolation layer between the car and a sling supporting it.

In a second step, the elevator parking brake 1 is activated before permitting a loading and/or unloading situation of the elevator car 2, when the elevator car 2 in the elevator shaft is located in the predetermined limit floor or below the predetermined limit floor. The elevator parking brake 1 is not activated before permitting a loading and/or unloading situation of the elevator car 2, when the elevator car 2 in the elevator shaft is located above the predetermined limit floor.

Accordingly, the elevator parking brake 1 is used only at or below the limit floor where the suspension rope 5 is the longest and an elongation of the suspension rope 5 is above a predetermined threshold value (e.g. calculated according the above example calculation). Thus, wear of the brake pad 108, 208, 308, 408, 508 is reduced and maintenance intervals of the elevator parking brake 1 can be increased.

Further, according to the method for operating an elevator parking brake according to the second embodiment, since the elevator parking brake is used only at or below the limit floor, loading/unloading operation of the elevator can be simplified in the upper floors such that less time is needed for the loading/unloading of the elevator car here.

Further, a control device 206 for an elevator parking brake 1 is provided. The control device 206 for an elevator parking brake 1 is configured to execute the method for operating an elevator parking brake described above. The control device 206 can be used as the control device 6.

The method for operating an elevator parking brake according to the second embodiment can be combined with the method for operating an elevator parking brake according to the first embodiment. In such case, it is determined according to the method for operating an elevator parking brake according to the second embodiment whether the elevator parking brake is to be used. Then, if it is determined that the elevator parking brake is to be used, the elevator parking brake is operated in accordance with the method for operating an elevator parking brake according to the first embodiment.

Third Embodiment

FIG. 3A schematically shows the configuration of an elevator parking brake 101 according to a third embodiment of the present disclosure. This elevator parking brake 101 can be used as the elevator parking brake 1 of the first and second embodiments.

The elevator parking brake 101 comprises a parking brake frame 110 attachable to the elevator car 2 in a movable manner so as to allow a predetermined amount of movement between the parking brake and the elevator car 2 in a upward/downward direction (gravity direction). The predetermined amount of movement is set in accordance with higher-level project requirements, and may be in the range of 1-4 mm, for example. The movement may be enabled by using elements such as guide surfaces, guiding pins and/or pivot points by which the elevator parking brake 101 is connected to the elevator car 2.

The above-described configuration of the elevator parking brake 101 allowing a predetermined amount of movement between the parking brake and the elevator car 2 in the upward/downward direction enables measurement of the second suspension rope force $F_1$ or the second traction sheave torque $M_1$ in the method for operating an elevator parking brake according to the first embodiment.

As shown in FIG. 3A, the elevator parking brake 101 further comprises a brake pad 108 configured to provide an elevator braking force against the guide rail 3. That is, the brake pad 108 can be brought in contact with one of the guide rails 3, and can be retracted from the one of the guide rails 3 by moving the brake pad 108 in a lateral direction perpendicular to the extension direction of the guide rail 3 (brake opening/closing direction). When the brake pad 108 is in contact with the one of the guide rails 3, friction is applied between the one guide rail 3 and the brake pad 108, and the elevator braking force can be applied between the one guide rail 3 and the brake pad 108. On the other hand, when the brake pad 108 is retracted from the one guide rail 3, the elevator parking brake 101 can move along the one guide rail 3 without friction therebetween. In a retracted state of the brake pad 108 (neutral position), a clearance between the brake pad 108 and the one guide rail 3 is typically set to 3-5 mm, for example, to avoid an unintended contact between the brake pad 108 and the one guide rail 3, when the one guide rail 3 is not extending in a perfectly straight manner.

The elevator parking brake 101 further comprises an actuating mechanism 111 for bringing the brake pad 108 in contact with the one guide rail 3 and retracting the brake pad 108 from the one guide rail 3. As shown in FIG. 3A, the actuating mechanism 111 comprises a motor 112, an actuating member 113 and a conversion mechanism 115 fixedly coupled to the parking brake frame 110. In the present embodiment, the brake pad 108 is disposed on the actuating member 113 so as to directly follow the linear movement of the actuating member 113.

In the present embodiment, as shown in FIG. 3A, the motor 112 is an integrated electric radial flux motor of the external rotor type, having a stator. Besides using an integrated electric radial flux motor, it is also possible to use another type of motor, such as an electric stepper motor, or a hydraulic motor, for example, coupled to the conversion mechanism 115 with gears. An advantage of the integrated electric radial flux motor is its high torque such that an additional reduction gear is not required. Thereby, the elevator parking brake 101 can be designed to be compact.

When the motor 112 is energized, an external rotor 116 and a shaft 117 fixedly coupled with it execute a rotational movement. The rotational movement can be performed in a counterclockwise and a clockwise direction. The shaft 117 is fixedly attached to or extended as the center screw of the planetary roller screw conversion mechanism 115, further extending as the actuating member 113 movable in the lateral direction (brake opening/closing direction) perpendicular to the extension direction of the guide rail 3, thereby executing a linear movement. The brake pad 108 is slidably mounted on the parking brake frame 110 so as to allow a linear movement with respect to the parking brake frame 110 in the lateral direction (brake opening/closing direction). A movement of the brake pad 108 with respect to the parking brake frame 110 in the upward/downward direction is prevented. Thus, a force can be transferred between the brake pad 108 and the parking brake frame 110 in the upward/downward direction, thereby allowing transferring a load of the elevator car 2 from the parking brake frame 110 to the one guide rail 3 so as to substantially hold the elevator car 2 in its place with respect to the one guide rail 3.

The actuating member 113 is configured to bring the brake pad 108 in contact with the one guide rail 3 by abutting against the brake pad 108 in the lateral direction. A process of activating the elevator parking brake 101 refers to moving the brake pad 108 towards the one guide rail 3 and pressing the brake pad 108 towards the one guide rail 3 (moving the brake pad 108 in a brake closing direction), thereby applying a contact pressure. A process of maintaining the elevator parking brake 101 in an activated state refers to a state, in which the brake pad 108 is in contact with the one guide rail 3, and the actuating member 113 is not executing the linear movement (not moving in the lateral direction). A process of retracting the elevator parking brake 101 refers to releasing the contact pressure between the brake pad 108 and the one guide rail 3 and moving the brake pad 108 away from the one guide rail 3 (moving the brake pad 108 in a brake opening direction).

Figure 3B:
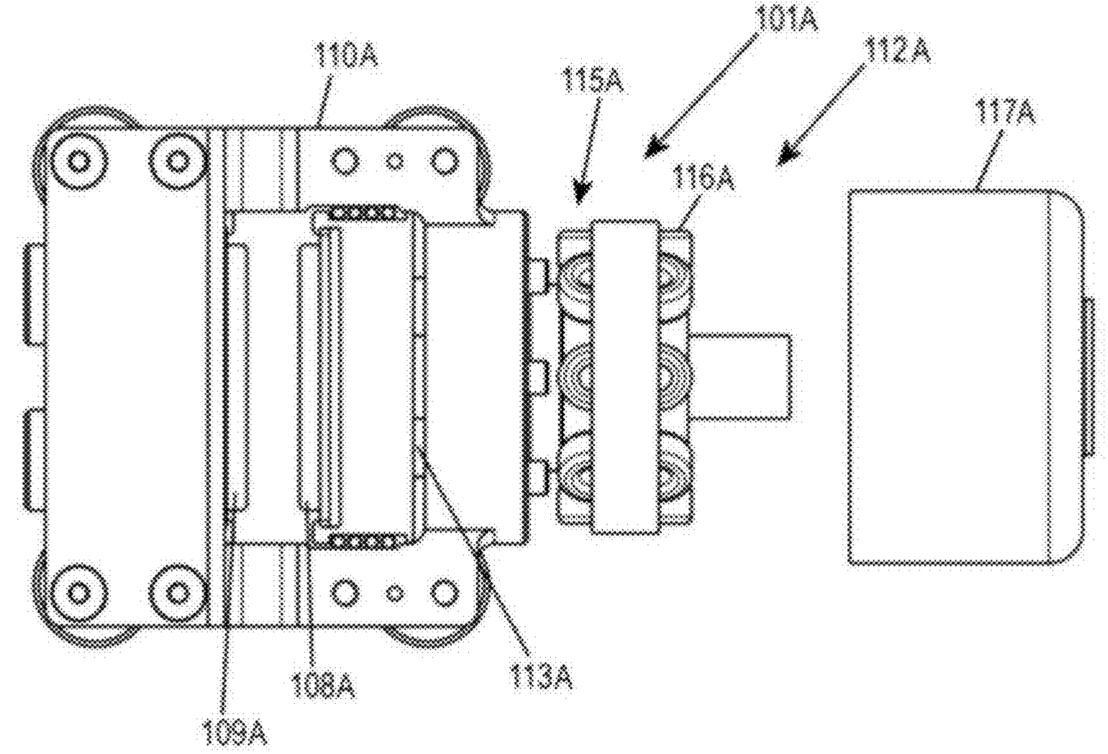
FIG. 3B illustrates an elevator parking brake according to a modification of the third embodiment of the present disclosure.

A conversion mechanism 115A of a parking brake 101A according a modification of the third embodiment, illustrated in FIG. 3B, is configured to convert the rotational movement of a rotor 116A into linear movement of an actuating member 113A. In the present modification, the conversion mechanism 115A is formed by a planetary roller screw, in which a nut of the planetary roller screw is fixedly and coaxially coupled with the rotor 116A accommodating the coils of a motor 112A, the screw shaft (not illustrated in FIG. 3B) is fixedly coupled with a motor end cup 117A accommodating the motor magnets, which end cup 117A is fixedly coupled with a parking brake frame 110A. Planetary rollers are arranged to orbit between the screw shaft and the nut. In order to activate and deactivate the elevator parking brake 101A, the motor 112A is caused to execute its rotational movement in the counterclockwise and the clockwise direction, thereby rotating the planetary roller nut as the actuating member 113A, the rotation moving it in the axial direction of the screw shaft in the brake closing direction and the brake opening direction of the linear movement, respectively.

In comparison with a conventional, threaded shaft-nut mechanism, the conversion efficiency is greatly improved by using a planetary roller screw in the conversion mechanism 115 or 115A because the contacts within the mechanism are rolling instead of sliding. Also, the elevator parking brakes 101 and 101A can be designed to be compact. As the planetary roller screw is conventionally known, further details are omitted hereafter.

According to the embodiments shown in FIGS. 3A and 3B, the elevator parking brake 101, 101A further comprises an auxiliary brake pad 109, 109A and a retaining spring 124. The auxiliary brake pad 109, 109A is arranged at a predetermined distance from the brake pad 108, 108A such that the one guide rail 3 is insertable therebetween. The brake pad 108, 108A and the auxiliary brake pad 109, 109A are facing each other so as to, in use, face two opposing sides of the one guide rail 3. The predetermined distance between the brake pad 108, 108A and the auxiliary brake pad 109, 109A is determined by adding a thickness of the one guide rail 3 in the lateral direction, a desired clearance between the auxiliary brake pad 109, 109A and the one guide rail 3, and a desired clearance between the brake pad 108, 108A and the one guide rail 3 when the brake pads 108, 108A and 109, 109A are in the neutral position. The retaining spring 124 is connected to the parking brake frame 110, 110A and holds the auxiliary brake pad 109, 109A so as to elastically connect the auxiliary brake pad 109, 109A to the parking brake frame 110, 110A and to allow a linear movement of the auxiliary brake pad 109, 109A in the lateral direction with respect to the parking brake frame 110, 110A. That is, only one of the brake pad 108, 108A and the auxiliary brake pad 109, 109A is actuated by the actuating mechanism 111. Such configuration corresponds to a floating mount type elevator parking brake, in other words, to a floating mount of the brake frame 110, 110A, which is known from disc brakes of vehicles, for example.

Although FIGS. 3A and 3B illustrate only one brake pad 108, 108A and one auxiliary brake pad 109, 109A, the elevator parking brake 101, 101A may include more than one brake pad 108, 108A and more than one auxiliary brake pad 109, 109A.

In the subsequent embodiments, only differences to the third embodiment are described, and a redundant description of features is omitted.

Fourth Embodiment

Figure 4:
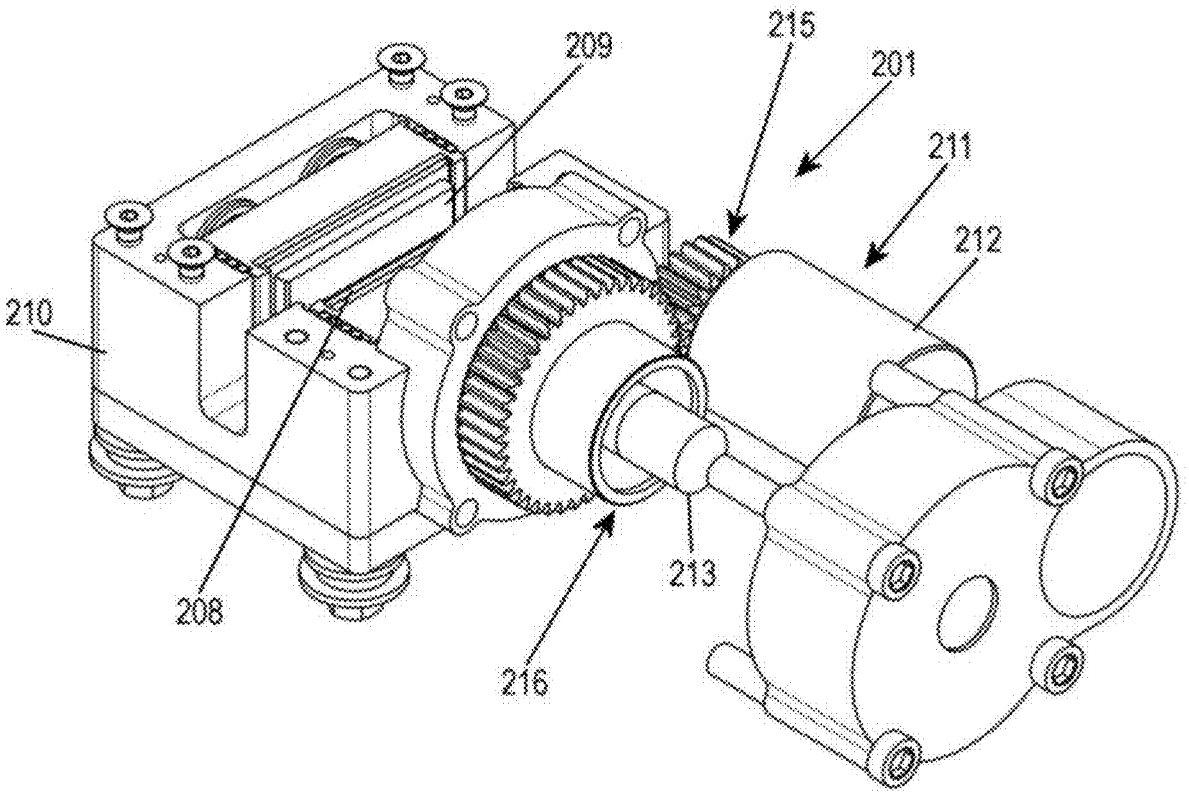
FIG. 4 illustrates an elevator parking brake according to a fourth embodiment of the present disclosure.

FIG. 4 illustrates an elevator parking brake 201 according to a fourth embodiment of the present disclosure. This elevator parking brake 201 can be used as the elevator parking brake 1 of the first and second embodiments.

The elevator parking brake 201 according to the fourth embodiment comprises a parking brake frame 210, a brake pad 208, an auxiliary brake pad 209, and an actuating mechanism 211. The actuating mechanism 211 comprises a motor 212, an actuating member 213, and a conversion mechanism 215.

In addition to the elevator parking brake 101 of the third embodiment, the elevator parking brake 201 according to the present embodiment further comprises a reduction gear 216 for gearing down a rotational speed of the motor 212. In the present embodiment, an inexpensive external motor can be used as the motor 212. Accordingly, in combination with the reduction gear 216, a high torque suitable for actuating the elevator parking brake 201 can be obtained, and an inexpensive motor 212 can be used.

The other elements of the elevator parking brake 201 according to the present embodiment work in a similar manner as described for the elevator parking brake 101 of the third embodiment.

Fifth Embodiment

Figure 5A:
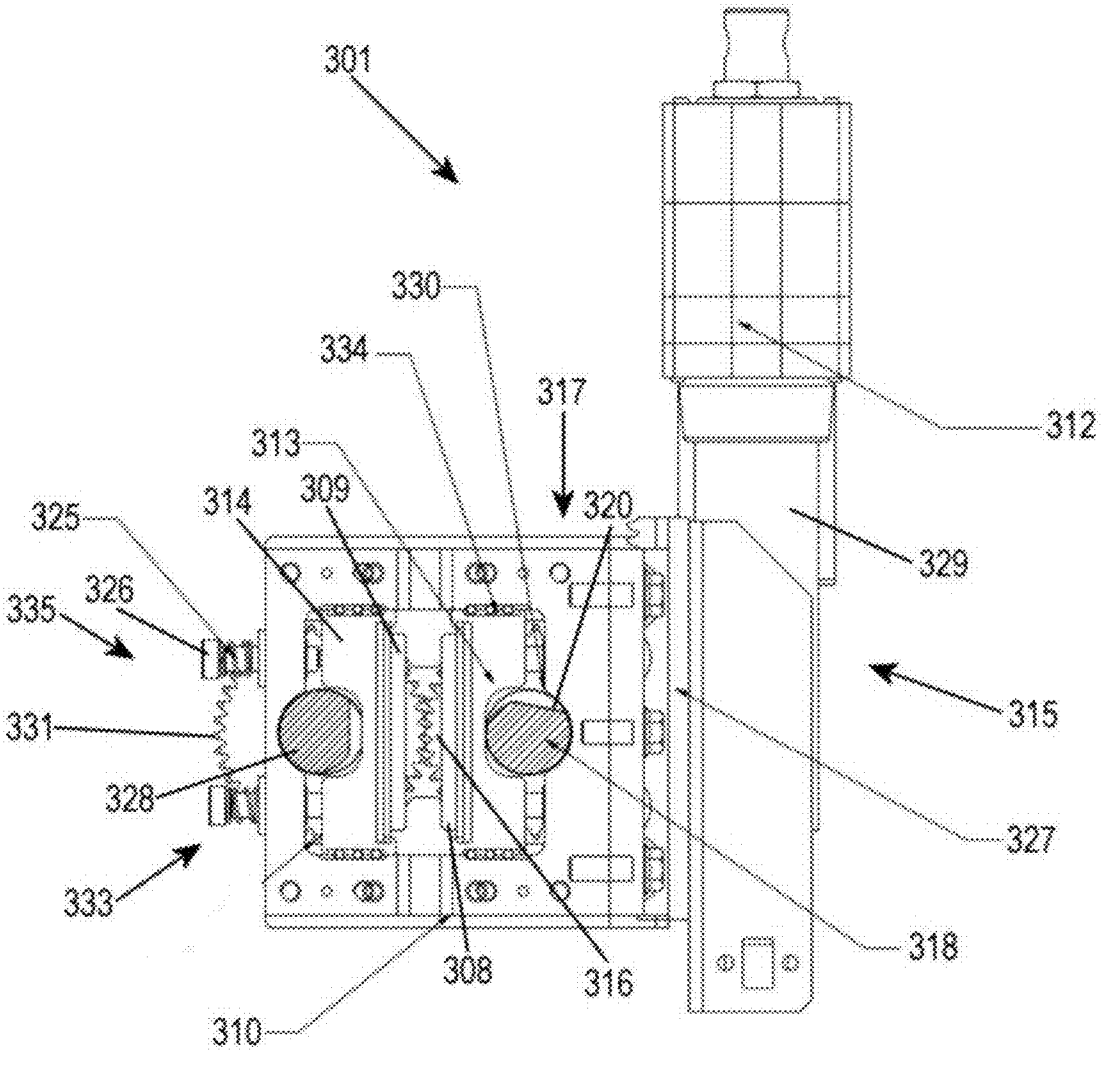
FIG. 5A illustrates an elevator parking brake according to a fifth embodiment of the present disclosure.

FIG. 5A illustrates an elevator parking brake 301 according to a fifth embodiment of the present disclosure. This elevator parking brake 301 can be used as the elevator parking brake 1 of the first and second embodiments.

In the present embodiment, the elevator parking brake 301 comprises a parking brake frame 310, an actuating member 313 and a brake pad 308. The actuating member 313 is slidably mounted on the parking brake frame 310 supported by needle bearings 334 so as to allow a linear movement with respect to the parking brake frame 310 in the lateral direction (brake opening/closing direction). The brake pad 308 is arranged on the actuating member 313 so as to directly follow the linear movement of the actuating member 313.

Further, the elevator parking brake 301 according to the present embodiment comprises an auxiliary actuating member 314 and an auxiliary brake pad 309. Similar to the actuating member 313, the auxiliary actuating member 314 is slidably mounted on the parking brake frame 310 so as to allow a linear movement with respect to the parking brake frame 310 in the lateral direction (brake opening/closing direction). The auxiliary brake pad 309 is arranged on the auxiliary actuating member 314 so as to directly follow the linear movement of the auxiliary actuating member 314. The auxiliary actuating member 314 is urged into an opening direction of the auxiliary brake pad 309 and the auxiliary actuating member 314 by auxiliary retaining springs 325. Auxiliary adjustment screws 326 are provided for adjusting the air gap between the guide rail 3 and the auxiliary brake pad 309 when the elevator parking brake 301 is deactivated. Although not shown in FIG. 5A, retaining springs and adjustment screws are provided for the actuating member 313 in a similar manner and for corresponding purposes.

The auxiliary brake pad 309 is arranged at a predetermined distance from the brake pad 308 such that the one guide rail 3 is insertable therebetween. The brake pad 308 and the auxiliary brake pad 309 are facing each other so as to, in use, face two opposing sides of the one guide rail 3.

As shown in FIG. 5A, the actuating mechanism 311 of the elevator parking brake 301 according to the present embodiment further comprises a motor 312, a gear 316, and a conversion mechanism 315 having a cam mechanism 317.

The motor 312 is a linear motor having a shaft 329 that is driven by the motor such as to perform a linear movement in a direction that is perpendicular to the brake opening/closing direction. A rack 327 having gear teeth is formed on the shaft 329 of the motor 312. The gear teeth of the rack 327 mesh with the gear 316. Accordingly, the gear 316 is rotationally driven by the linear movement of the shaft 329 of the motor 312.

The gear 316 is rotatably provided on the parking brake frame 310 such that a rotation axis of the gear 316 is perpendicular to the brake opening/closing direction.

The gear 316 is coupled to the cam mechanism 317. The cam mechanism 317 has the cam member 318 driven to rotate by the linear movement of the motor 312 via the gear 316. The cam member is rotationally supported by a sliding bearing 330. The cam member 318 has a radially outer circumferential profile referred to as a driving profile 320 of the cam member 318 (radial cam).

Figure 5B:
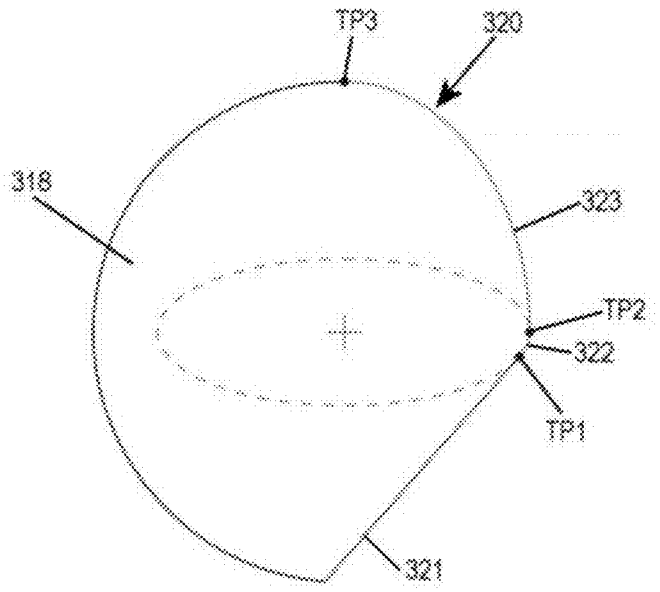
FIG. 5B shows a cam mechanism of the elevator parking brake according to the fifth embodiment of the present disclosure.

Further, as shown in FIG. 5B, the driving profile 320 comprises a rest profile 321 configured to abut against the actuating member 313 when the elevator parking brake 301 is deactivated, a closing profile 322 continuous to the rest profile 321 and configured to abut against the actuating member 313 before the brake pad 308 comes in contact with the guide rail 3, and a tightening profile 323 continuous with the closing profile 322 and configured to abut against the actuating member 313 when the brake pad 308 is in contact with the guide rail 3.

As shown in FIG. 5B, the rest profile 321 is formed by a flat profile. A minimum radial distance between the rest profile 321 and a rotation axis of the cam member 318 is referred to as a rest profile distance.

As shown in FIG. 5B, the closing profile 322 extends along a part of a virtual ellipse around the rotation axis of the cam member 318 from tangent point TP1 to tangent point TP2. A radial distance between the closing profile 322 and the rotation axis of the cam member 318 continuously increases along the closing profile 322 from tangent point TP1 to tangent point TP2. Further, as shown in FIG. 5B, a radial distance between the tightening profile 323 and the rotation axis of the cam member 318 continuously increases along the tightening profile 323 from tangent point TP2 to tangent point TP3. Accordingly, when either of the closing profile 322 or the tightening profile 323 abuts against the actuating member 313 and the cam member 318 rotates, the actuating member 313 is displaced in the brake opening/closing direction.

However, an increase of the radial distance between the closing profile 322 and the rotation axis of the cam member 318 along the closing profile 322 is larger than an increase of the radial distance between the tightening profile 323 and the rotation axis of the cam member 318 along the tightening profile 323. In other words, a first derivative of the radial distance between the respective profile and the rotation axis of the cam member 318 with respect to a rotation angle variation of the cam member 318 is smaller along the tightening profile 323 than along the closing profile 322.

The above-mentioned first derivative of the radial distance between the driving profile 320 (closing profile 322, tightening profile 323) and the rotation axis of the cam member 318 with respect to a rotation angle variation of the cam member 318 corresponds to a slope of the driving profile, which is defined as a linear position variation of the actuating member 313 divided by a rotation angle variation of the driving profile 320. Accordingly, a tightening profile slope is smaller than a closing profile slope.

Further, when a conversion ratio of the cam mechanism 317 is defined as a rotational angle variation of the cam member 318 with respect to a linear position variation of the actuating member 313, the cam mechanism thus provides a variable conversion ratio. In particular, the conversion ratio provided by the tightening profile 323 is larger than the conversion ratio provided by the closing profile 322.

Therefore, the brake pad 308 can rapidly be brought into contact with the guide rail 3 due to the small conversion ratio of the closing profile 322. Then, when contact between the brake pad 308 and the guide rail 3 is established, a large contact force of the brake pad 308 onto the guide rail 3 can be exerted by the motor 312 due to the large conversion ratio of the tightening profile 323.

In the present embodiment, as shown in FIG. 5A, the actuating mechanism 311 of the elevator parking brake 301 further comprises an auxiliary conversion mechanism 335, which is a mirror image of the conversion mechanism 315 comprising an auxiliary cam mechanism 333 having an auxiliary cam member 328.

The auxiliary cam member 328 is formed in a similar manner as the cam member 318, and is configured to cause the linear movement of the auxiliary actuating member 314, similar but mirror-inverted to the linear movement of the cam member 318. Thus, a detailed description of the auxiliary cam mechanism 333 is omitted hereafter.

Further, the auxiliary cam member 328 is coupled to an auxiliary gear 331. The auxiliary gear 331 is rotatably provided on the parking brake frame 310 and meshes with the gear 316 so as to synchronize the linear movement of the auxiliary actuating member 314 with the linear movement of the actuating member 313 in an opposing manner. Thereby, the linear movement of the auxiliary actuating member 314 is executed in a mirror-inverted manner as compared to the linear movement of the actuating member 313.

Figure 5C:
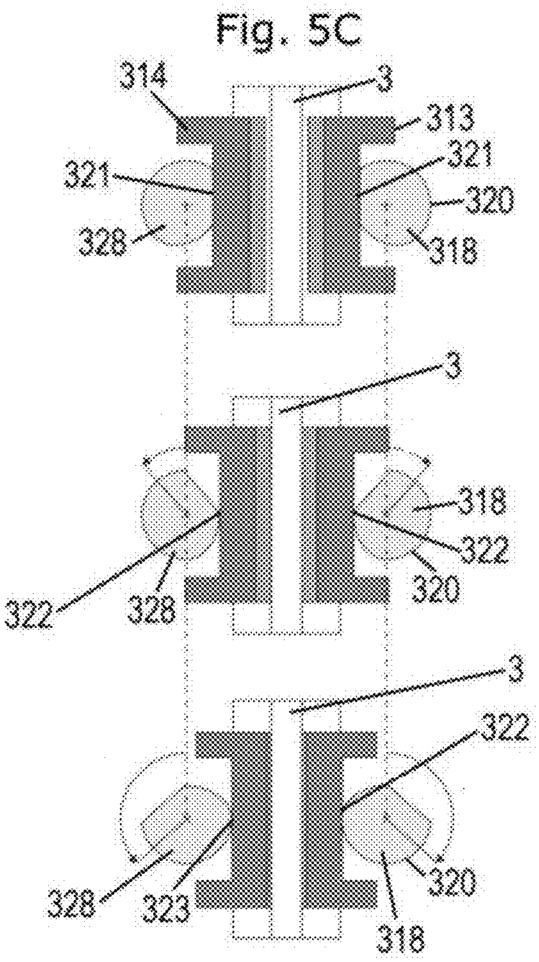
FIG. 5C shows a working cycle of the cam mechanism of the elevator parking brake according to the fifth embodiment of the present disclosure.

FIG. 5C shows a working cycle of the elevator parking brake 301. In a first illustration of FIG. 5C, the elevator parking brake 301 is not activated (retracted state) and the rest profiles 321 of the cam member 318 and the auxiliary cam member 328 abut against the actuating member 313 and auxiliary actuating member 314, respectively. Thus, the clearance between the brake pad 308 and the one guide rail 3 and the clearance between the auxiliary brake pad 309 and the one guide rail 3 is maintained.

In the second illustration of FIG. 5C, the elevator parking brake 301 is activated and the cam member 318 and the auxiliary cam member 328 are driven to rotate such that the closing profiles 322 abut against the actuating member 313 and the auxiliary actuating member 314 between tangent point TP1 and tangent point TP2. Thus, the brake pad 308 and the auxiliary brake pad 309 are brought in contact with the one guide rail 3. With the closing profiles 322, the actuating member 313 and the auxiliary actuating member 314 exert a large movement in the brake opening/closing direction per rotation angle of the cam member 318 and the auxiliary cam member 328, respectively. Thereby, it is possible to quickly move the brake pad 308 and the auxiliary brake pad 309 towards the one guide rail 3.

In the third illustration of FIG. 5C, the cam member 318 and the auxiliary cam member 328 are driven to rotate further in one direction such that the tightening profiles 323 abut against the actuating member 313 and the auxiliary actuating member 314 between tangent point TP2 and tangent point TP3. Thus, the brake pad 308 and the auxiliary brake pad 309 are pressed firmly against the guide rail 3 so as to enable the elevator parking brake 301 to bear a load in the upward/downward direction. At tangent point TP3, a maximum pressing force $F_{compr}$ is applied between the brake pad 308 and the one guide rail 3 and between the auxiliary brake pad 309 and the one guide rail 3. With the tightening profile 323, the actuating member 313 and the auxiliary actuating member 314 exert a small movement in the brake opening/closing direction per rotation angle of the cam member 318 and the auxiliary cam member 328, respectively. Thereby, it is possible to slowly apply a firm contact pressure between the brake pad 308 and the one guide rail 3 and between the auxiliary brake pad 309 and the one guide rail 3.

The maximum pressing force $F_{compr}$, by which the brake pad 308 and the auxiliary brake pad 309 are pressed against the one guide rail 3, can be determined by the following example calculation:

$$F_{compr} = \frac{sf \times Q \times g}{\mu \times n_b \times n_p} = \frac{1.5 \times 1000\ \text{kg} \times 9.80665\ \text{m/s}^2}{0.25 \times 2 \times 2} \approx 14710\ \text{N}$$

In the above example calculation, sf is a safety factor against slipping, Q is a load to be carried, g is the gravitational acceleration near Earth's surface, u is a friction factor between the brake pad 308 and the guide rail 3, $n_b$ is the number of brake units, and np is the number of brake pads.

Sixth Embodiment

Figure 6A:
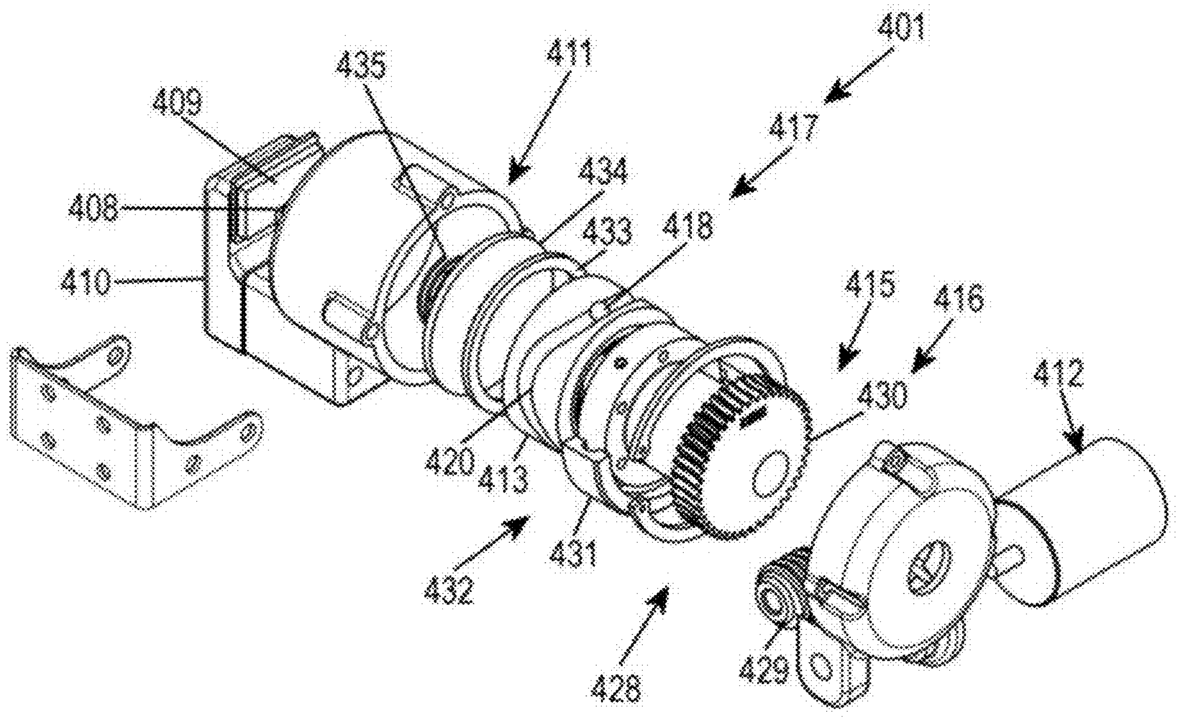
FIG. 6A illustrates an elevator parking brake according to a sixth embodiment of the present disclosure.

FIG. 6A illustrates an elevator parking brake 401 according to a sixth embodiment of the present disclosure. This elevator parking brake 401 can be used as the elevator parking brake 1 of the first and second embodiments.

Similar to the elevator parking brake 301 of the fifth embodiment, the elevator parking brake 401 according to the present embodiment comprises a parking brake frame 410, a brake pad 408, an auxiliary brake pad 409, an actuating mechanism 411, and a conversion mechanism 415 having a cam mechanism 417.

Coupling between the parking brake 401 and the elevator car 2 allows a restricted lateral movement of the parking brake frame 410 in relation to the car 2. Pushing the brake pad 408 against the guide rail 3 by actuating the actuating mechanism 411 and the conversion mechanism 415 will move the brake frame 410 such that the brake pressure on the guide rail 3 will increase equally on both the brake pad 408 and the auxiliary brake pad 409.

In the present embodiment, the conversion mechanism 415 further comprises a reduction gear 416 formed by a worm gear 428 and a planetary gear 432. A shaft of a motor 412 is coupled to a worm screw 429 of the worm gear 428. The worm screw 429 meshes with a worm wheel 430, thereby gearing down a rotational speed of the motor 412.

The worm wheel 430 is rotatably provided on the parking brake frame 410 such that a rotation axis of the worm wheel 430 is parallel to the brake opening/closing direction.

The worm wheel 430 is coupled to the cam mechanism 417. Particularly, the worm wheel 430 is rotatably coupled to a sun gear (not shown) of the planetary gear 432. Three planets (not shown) orbit around the sun gear and mesh with a ring gear formed in an actuating cam member 413 of the cam mechanism 417, as shown in FIG. 6A.

The actuating member 413 is driven to rotate around an axis parallel to the brake opening/closing direction by the rotational movement of the motor 412 via the reduction gear 416. The actuating member 413 has a driving profile 420 formed by an axial surface of a groove formed in an outer peripheral surface of the actuating member 413 (cylindrical cam). Balls 418 are inserted in the groove of the actuating member 413, thereby contacting the axial surface of the groove. The balls 418 are engaged with circumferential grooves formed on an inner circumferential surface of a fixed member 431. A rotation of the fixed member 431 around the rotation axis of the actuating member 413 is restricted. Further, a movement of the fixed member in the direction of the rotation axis of the actuating member 413 is restricted. Accordingly, when the balls 418 are engaged with the grooves of the fixed member 431, an axial position of the balls 418 is determined. Furthermore, a revolving movement of the balls 418 around the rotation axis of the actuating member 413 is restricted by circumferential ends in the rotation direction of the actuating member 413 of the grooves of the fixed member 431.

Due to the above-described configuration of the actuating member 413, the balls 418 and the fixed member 431, when the actuating member 413 is rotationally driven by the motor 412, the position of the balls 418 in the circumferential direction and in the axial direction is determined and the driving profile 420 slides along the balls 418. Since the driving profile 420 is curved, the actuating member 413 is displaced in the axial direction (brake opening/closing direction) upon rotation of the actuating member 413. That is, the driving profile is at least partially configured to convert movement of the motor 412 into linear movement of the actuating member 413 in the axial direction. In particular, portions of the driving profile 420 extending in directions crossing the circumferential direction of the actuating member 413 are configured to convert movement of the motor 412 into linear movement of the actuating member 413. The brake pad 408 is connected to the actuating member 413 via a thrust bearing 433 and a plate 434 and is retained by a spring 435. Therefore, the brake pad 408 is displaced in accordance with the displacement of the actuating member 413 in the axial direction.

Figure 6B:
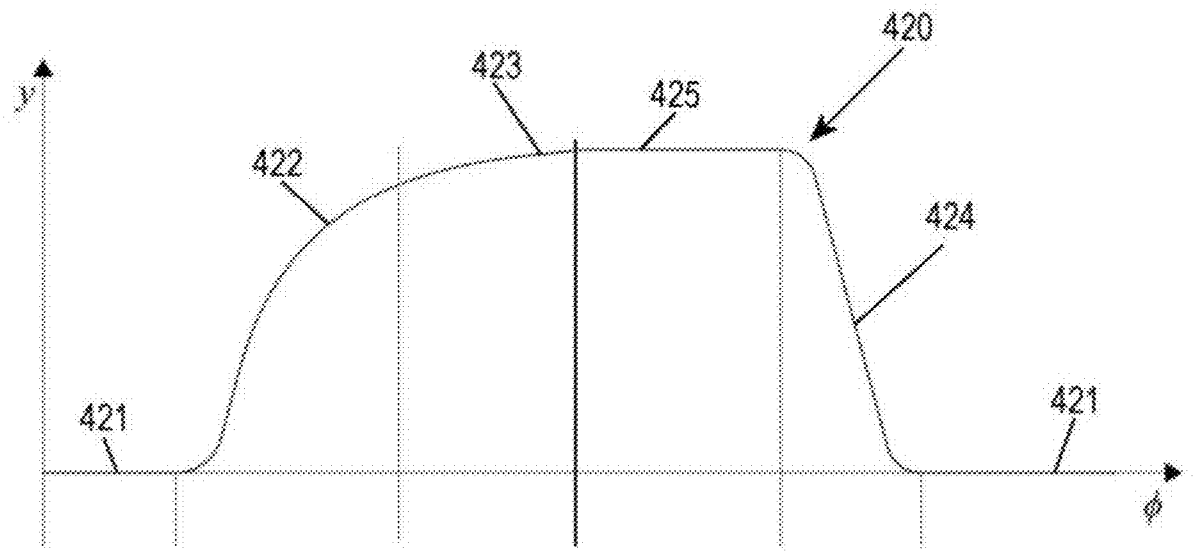
FIG. 6B schematically shows an exemplary relation between a rotation angle of a cam mechanism and the resulting displacement of an actuating member of the elevator parking brake according to the sixth embodiment of the present disclosure.

The graph of FIG. 6B shows a displacement y of the actuating member 413 in the brake opening/closing direction as a function of a rotation angle Φ of the actuating member 413 relative to the fixed member 431 in one working cycle, comprising the phases corresponding to a rest profile 421, a closing profile 422, a tightening profile 423, a holding profile 425 and, optionally, a releasing profile 424 of the drive profile 420.

The rest phase corresponds to the retracted (not activated) state of the parking brake 401. Rotation of the actuating member 413 causes axial movement of the actuating member 413 in the brake opening/closing direction urged by the balls 418 following the curve of the closing profile section of the driving profile 420, thereby quickly closing the gap between brake pads 408, 409 and the guide rail 3. Between the rest profile 421 and the closing profile 422, a transition region is provided in order to enable a smooth acceleration of the actuating member in the axial direction.

Further rotation of the actuating member 413 brings the balls 418 to the tightening profile section of the driving profile 420, the actuating member 413 thereby causing the brake pads 408, 409 to be pressed against the guide rail 3 for the braking effect.

Even further rotation of the actuating member 413 brings the balls 418 to the holding profile section of the driving profile 420. In this phase, the braking force of the parking brake 401 is at its highest.

The parking brake 401 is released by further rotation of the actuating member 413 through the releasing profile 424, the balls 418 following the releasing profile section of the driving profile 420 or, alternatively, by reverse rotation of the actuating member 413.

The slope (gradient) of the driving profile 420 shown in FIG. 6B is defined as a linear position variation (displacement y) of the actuating member 413 divided by a variation of the rotation angle Φ of the driving profile 420. The slope of the driving profile 420 is smaller in the tightening profile 423 than in the closing profile 422. A conversion ratio is defined as a rotation angle variation of the actuation member 413 with respect to a linear position variation (displacement y) of the actuating member 413. Accordingly, a smaller slope of the driving profile 420 shown in FIG. 6B corresponds to a larger conversion ratio. Therefore, the conversion ratio is larger in the tightening profile 423 than in the closing profile 422. Thus, the driving profile 420 is at least partially configured to set a variable conversion ratio between movement of the motor 412 and linear movement of the actuating member 413. In particular, a portion of the driving profile corresponding to the closing profile 422 and the tightening profile 423 is configured to set a variable conversion ratio between movement of the motor 412 and linear movement of the actuating member 413.

Furthermore, the slope of the driving profile 420 gradually decreases across the closing profile 422. In this regard, the transition region between the rest profile 421 and the closing profile 422 is not to be regarded as part of the closing profile 422. Further, the slope of the driving profile 420 gradually decreases across the tightening profile 423. Accordingly, an increasing conversion ratio is provided across the closing profile 422 and the tightening profile 423, respectively.

Due to the above-described configuration of the driving profile 420 of the actuating member 413, the elevator parking brake 401 according to the sixth embodiment has a variable conversion ratio such that the actuating member 413 and the brake pad 408 can be displaced in the brake opening/closing direction with a variable axial speed, while the motor 412 rotates with a constant rotational speed. Therefore, the brake pad 408 can be rapidly brought into contact with the guide rail 3. Then, when contact between the brake pad 408 and the guide rail 3 is established, a large contact force of the brake pad 408 onto the guide rail 3 can be exerted by the motor 412 due to the large conversion ratio provided by the tightening profile 423.

The above-mentioned driving profile 420 is provided multiple times in the circumferential direction of the actuating member 413 so as to provide a plurality of continuous driving profiles 420 along the circumference of the actuating member 413. In the embodiment of FIG. 6A, the driving profile 420 is provided two times in the circumferential direction of the actuating member 413.

Figure 6C:
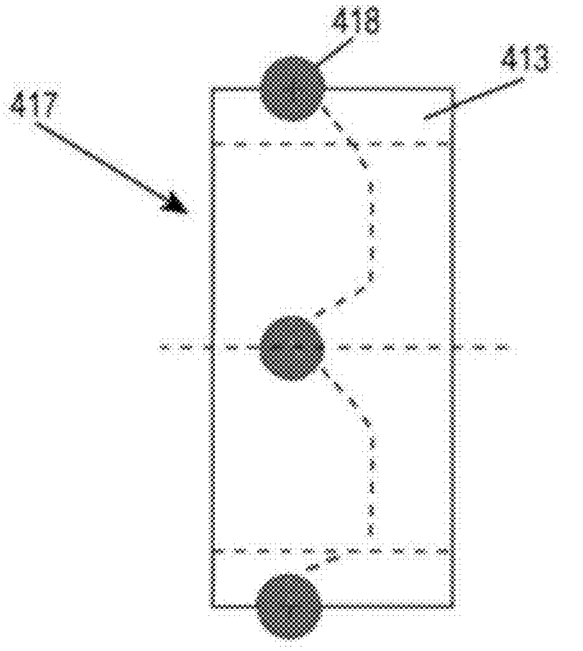
FIG. 6C shows a modified cam mechanism of the elevator parking brake according to the sixth embodiment of the present disclosure.

The driving profile 420 does not necessarily have to be provided four times on the actuating member 413. FIG. 6C shows a modified cam mechanism 417 of the elevator parking brake 401 in a side view. Here, the axial relative movement of the balls 418 with respect to the actuating member 413 in accordance with the above-described driving profile 420 is illustrated by a dotted line. In the cam mechanism of FIG. 6C the driving profile 420 is provided four times in the circumferential direction of the actuating member 413, each driving profile 420 followed by a ball 418, each ball 418 in the same phase of the driving profile 420.

In the sixth embodiment, the elevator parking brake 401 has the cam mechanism 417 in which the actuating member 413 rotates and moves in the axial direction such as to actuate the brake pad 308, while movement of the fixed member 431 is restricted in both the circumferential and the axial direction. Alternatively, in a modification of the elevator parking brake 401 according to the sixth embodiment, movement of an actuating member in the axial direction may be restricted and the fixed member may be allowed to reciprocate in the axial direction. Accordingly, in such modification, the fixed member moves in the axial direction in accordance with the driving profile provided on the actuating member and actuates a brake pad.

Seventh Embodiment

Figure 7:
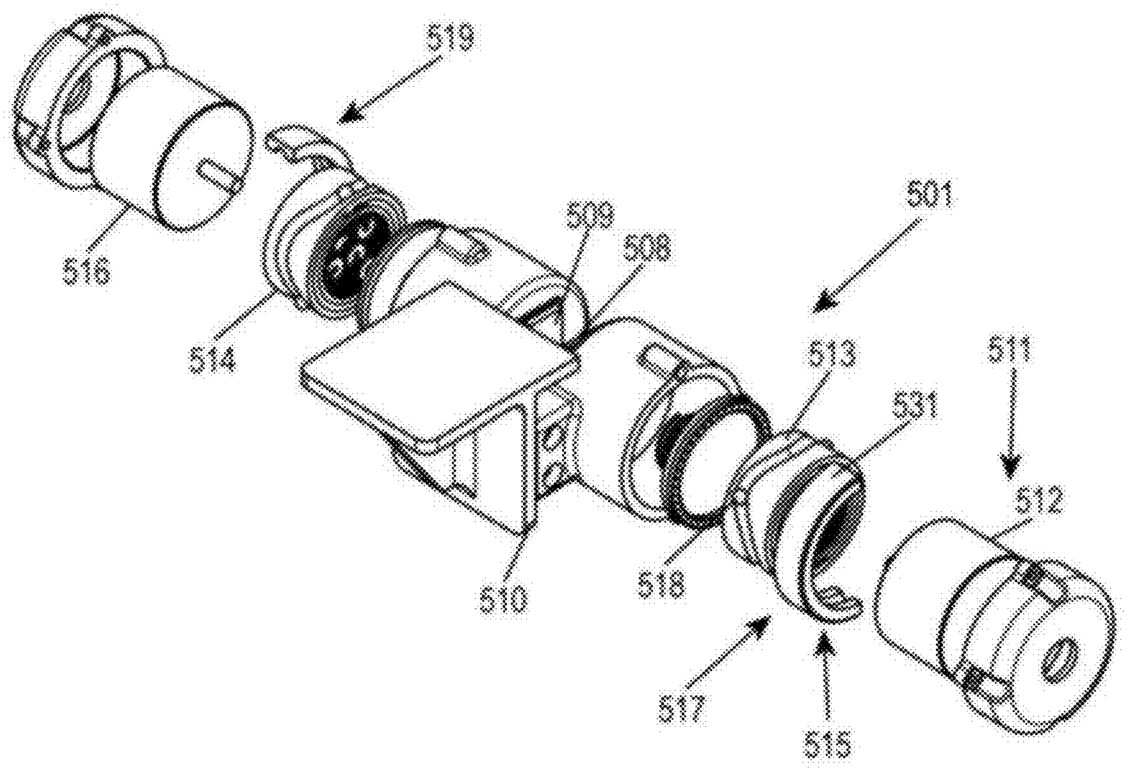
FIG. 7 illustrates an elevator parking brake according to a seventh embodiment of the present disclosure.

FIG. 7 illustrates an elevator parking brake 501 according to a seventh embodiment of the present disclosure. This elevator parking brake 501 can be used as the elevator parking brake 1 of the first and second embodiments.

The elevator parking brake 501 according to the seventh embodiment comprises a parking brake frame 510, a brake pad 508, an auxiliary brake pad 509, and an actuating mechanism 511. The actuating mechanism 511 comprises a motor 512, an actuating member 513, and a conversion mechanism 515. The conversion mechanism 515 comprises a cam mechanism 517 having balls 518 and a fixed member 531. The configuration of the actuating mechanism 511 is the same as the configuration of the actuating mechanism 411 of the elevator parking brake 401 according to the sixth embodiment.

In contrast to the elevator parking brake 401 of the sixth embodiment, the elevator parking brake 501 according to the present embodiment further comprises an auxiliary actuating mechanism 519 that is configured to exert a linear movement in the brake opening/closing direction so as to bring the auxiliary brake pad 509 in contact with the guide rail 3 and to retract the auxiliary brake pad 509 from the guide rail 3. The configuration of the auxiliary actuating mechanism 519 is basically the same as the configuration of the actuating mechanism 511, but is a mirror image of the actuating mechanism 511, as shown in FIG. 7.

Thus, the linear movement of an auxiliary actuating member 514 is synchronized with the linear movement of the actuating member 513 in an opposing manner. In other words, the linear movement of the auxiliary actuating member 514 is executed in a mirror-inverted manner as compared to the linear movement of the actuating member 513. Such a synchronization of the actuating member 513 and the auxiliary actuating member 514 is obtained by another motor 516 driving the auxiliary actuating member 514 in a similar but inverted manner as the motor 512 drives the actuating member 513.

The other elements of the elevator parking brake 501 according to the present embodiment work in a similar manner as described for the elevator parking brake 401 of the sixth embodiment.

All elevator parking brakes according to the above embodiments can be mounted in a floating manner for horizontal self-centering action in relation to the guide rail using a floating mount between the elevator parking brake and the car 2, the principle of which is known, for example, from automotive disc brake designs with floating brake calipers.

While several embodiments of the elevator parking brake have been described above in detail, the components described in different embodiments can be combined with each other. That is, the particular features, structures or characteristics may be combined as suitable in one or more embodiments of the disclosure.

For example, the method for operating an elevator parking brake according to the first and second embodiment can be carried out with the elevator parking brake 101, 201, 301, 401, 501 described in the various embodiments above. However, the method for operating an elevator parking brake is not limited to being carried out with the elevator parking brake 101, 201, 301, 401, 501 described above, and may be carried out with any elevator parking brake suitable for braking an elevator car 2, which is guided along an elevator shaft by a guide rail 3 and suspended by a suspension rope 5 which is hoisted by a traction sheave 7. On the other hand, the elevator parking brake 101, 201, 301, 401, 501 described above does not have to be operated by the method for operating an elevator parking brake disclosed herein, but may be operated by another method.

LIST OF REFERENCE SIGNS

1; 101; 201; 301; 401; 501 elevator parking brake
2 elevator car
3 guide rail
4 elevator shaft
5 suspension rope
6; 106; 206 control device
7 traction sheave
8 pulley
108; 208; 308; 408; 508 brake pad
109; 209; 309; 409; 509 auxiliary brake pad
110; 210; 310; 410; 510 parking brake frame
111; 211; 311; 411; 511 actuating mechanism
112; 212; 312; 412; 512 motor
113; 213; 313; 413; 513 actuating member
314; 514 auxiliary actuating member
115; 215; 315; 415; 515 conversion mechanism
116 rotor
216; 416 reduction gear
316 gear
516 motor
117 shaft
317; 417; 517 cam mechanism
318 cam member
418; 518 ball
519 auxiliary actuating mechanism
320; 420 driving profile
321; 421 rest profile
322; 422 closing profile
323; 423 tightening profile
124 retaining spring
424 releasing profile
325 auxiliary retaining spring
425 holding profile
326 auxiliary adjustment screw
26 suspension rope suspending point
327 rack
328 auxiliary cam member
428 worm gear
329 shaft
429 worm screw
330 sliding bearing
430 worm wheel
431; 531 fixed member
432 planetary gear
333 auxiliary cam mechanism
433 thrust bearing
334 needle bearing
434 thrust plate
335 auxiliary conversion mechanism
435 retaining spring

The invention claimed is:

1. An elevator parking brake, comprising:

a parking brake frame attachable to an elevator car;

a brake pad configured to be brought in contact with a guide rail guiding the elevator car along an elevator shaft; and an actuating mechanism mounted on the parking brake frame, for bringing the brake pad in contact with the guide rail, wherein the actuating mechanism comprises:

a motor;

an actuating member; and a conversion mechanism configured to convert movement of the motor into linear movement of the actuating member, the actuating member thereby bringing the brake pad in contact with the guide rail, wherein the conversion mechanism comprises:

a cam mechanism having a driving profile, wherein the driving profile is at least partially configured to convert movement of the motor into linear movement of the actuating member, and wherein the driving profile comprises:

a closing profile configured to position the actuating member before the brake pad comes in contact with the guide rail; and a tightening profile continuous with the closing profile and configured to position the actuating member when the brake pad is in contact with the guide rail, wherein a tightening profile slope defined as a linear position variation of the actuating member divided by a rotation angle variation of the driving profile when the actuating member is positioned by the tightening profile, is smaller than a closing profile slope defined as a linear position variation of the actuating member divided by a rotation angle variation of the driving profile, when the actuating member is positioned by the closing profile.

2. The elevator parking brake according to claim 1, wherein the parking brake frame is attachable to the elevator car in a movable manner so as to allow a predetermined amount of movement between the parking brake frame and the elevator car in a gravity direction.

3. The elevator parking brake according to claim 1, wherein the conversion mechanism comprises a planetary roller screw.

4. The elevator parking brake according to claim 1, the conversion mechanism further comprising:

a reduction gear for gearing down a speed of the motor.

5. The elevator parking brake according to claim 1, wherein the driving profile is at least partially configured to set a variable conversion ratio between movement of the motor and linear movement of the actuating member.

6. The elevator parking brake according to claim 1, wherein the closing profile provides an increasing conversion ratio across the closing profile when rotating the driving profile in one direction, and the tightening profile provides an increasing conversion ratio across the tightening profile when rotating the driving profile in the one direction.

7. The elevator parking brake according to claim 1, wherein the cam mechanism has a cam member driven to rotate by the movement of the motor, wherein the driving profile is formed on the cam member, wherein the driving profile is in contact with the actuating member, wherein the driving profile is configured to convert the rotational movement of the cam member into the linear movement of the actuating member, and wherein a linear movement direction of the actuating member is perpendicular to a rotation axis of the cam member and the driving profile.

8. The elevator parking brake according to claim 1, wherein the driving profile is formed on a cam member of the cam mechanism and is in contact with the actuating member, and wherein a linear movement direction of the actuating member is parallel to a rotation axis of the cam member.

9. The elevator parking brake according to claim 1, further comprising:

an auxiliary brake pad, the auxiliary brake pad and the brake pad being arranged at a predetermined distance from each other such that the guide rail is insertable therebetween, wherein the actuating mechanism further comprises an auxiliary actuating member configured to bring the auxiliary brake pad in contact with the guide rail, a linear movement of the auxiliary actuating member being synchronized with and opposed to the linear movement of the actuating member.

10. The elevator parking brake according to claim 1, further comprising:

an auxiliary brake pad; and a retaining spring elastically connecting the auxiliary brake pad to the parking brake frame, wherein the auxiliary brake pad and the brake pad are arranged at a predetermined distance from each other such that the guide rail is insertable therebetween.

11. A method for operating the elevator parking brake according to claim 1 for braking the elevator car guided along the elevator shaft by the guide rail and suspended by a suspension rope, the suspension rope being hoisted by a traction sheave, the method comprising the steps of:

activating the elevator parking brake so as to bring the brake pad of the elevator car in contact with the guide rail;

acquiring a first suspension rope force in the suspension rope, which is detected by a load cell at an upper suspension rope suspending point, a load cell located between the traction sheave and a traction sheave mounting point of the elevator shaft, or a first traction sheave torque applied to the traction sheave, which is detected by a traction sheave torque acquiring means before permitting a loading and/or unloading situation of the elevator car;

while the elevator parking brake is maintained in an activated state, permitting the loading and/or unloading situation of the elevator car so as to allow applying a differential load to the elevator car, the elevator parking brake at least partially bearing the differential load;

acquiring a second suspension rope force in the suspension rope or a second traction sheave torque applied to the traction sheave, while the elevator parking brake is maintained in the activated state and after permitting the loading and/or unloading situation of the elevator car;

tightening or loosening the suspension rope so as to at least partially transfer the differential load borne by the elevator parking brake to the suspension rope, while the elevator parking brake is maintained in the activated state; and deactivating the elevator parking brake by retracting the brake pad from the guide rail, after tightening or loosening of the suspension rope.

12. The method for operating an elevator parking brake according to claim 11, the method further comprising the steps of:

comparing the first suspension rope force with the second suspension rope force or comparing the first traction sheave torque with the second traction sheave torque;

determining that the suspension rope is to be tightened if the second suspension rope force is higher than the first suspension rope force or the second traction sheave torque is higher than the first traction sheave torque; and determining that the suspension rope is to be loosened if the second suspension rope force is lower than the first suspension rope force or the second traction sheave torque is lower than the first traction sheave torque.

13. The method for operating an elevator parking brake according to claim 11, the method further comprising the step of:

stopping the tightening or loosening of the suspension rope when a slope of the second suspension rope force or a slope of the second traction sheave torque with respect to a rotation angle of the traction sheave, by which the suspension rope is tightened and loosened, becomes lower than a threshold value.

14. The method for operating an elevator parking brake according to claim 11, wherein the second suspension rope force or the second traction sheave torque is acquired after stopping the loading and/or unloading situation of the elevator car.

15. The method for operating an elevator parking brake according to claim 11, the method further comprising the steps of:

determining whether the elevator car in the elevator shaft is located in a predetermined limit floor or below;

permit activating the elevator parking brake, when the elevator car in the elevator shaft is located in the predetermined limit floor or below the predetermined limit floor; and prohibit activating the elevator parking brake, when the elevator car in the elevator shaft is located in a floor above the predetermined limit floor.

16. The method for operating an elevator parking brake according to claim 15, wherein the predetermined limit floor is determined on the basis of a mass of the elevator car and predetermined limit values for a maximum tolerated sag and bounce of the elevator car.

17. A control device for an elevator parking brake for braking an elevator car guided along an elevator shaft by a guide rail and suspended by a suspension rope, the suspension rope being hoisted by a traction sheave, wherein the control device is configured to perform the method for operating an elevator parking brake according to claim 11.

* * * * *